United States Patent [19]

Jones et al.

[11] 3,989,855

[45] Nov. 2, 1976

[54] FREEZING PROCESS FOR PRODUCTION OF INSTANT GRITS

[75] Inventors: Benjamin Bostick Jones, Savannah, Ga.; Richard John Karrasch, Sterrett; Mike Kelly, Birmingham, both of Ala.

[73] Assignee: The Jim Dandy Company, Birmingham, Ala.

[22] Filed: Dec. 18, 1974

[21] Appl. No.: 534,348

[52] U.S. Cl. .............................. 426/444; 426/456; 426/524
[51] Int. Cl.$^2$ ...................... A23L 1/00; A23L 3/00; A23L 1/168
[58] Field of Search ........... 426/444, 620, 661, 656, 426/578, 456, 458, 465, 466, 524

[56] References Cited
UNITED STATES PATENTS

| | | | |
|---|---|---|---|
| 2,406,585 | 8/1946 | Buchanan et al. | 426/620 X |
| 2,733,147 | 1/1956 | Ozai-Durrani | 426/465 X |
| 2,801,176 | 7/1957 | Ozai-Durrani | 426/620 |
| 2,813,796 | 11/1957 | Keneaster et al. | 426/444 |
| 3,150,978 | 9/1964 | Campfield | 426/456 |
| 3,526,514 | 9/1970 | Gralak et al. | 426/620 |
| 3,692,533 | 9/1972 | Paine | 426/524 X |
| 3,787,584 | 1/1974 | Hyldon | 426/620 |

OTHER PUBLICATIONS

Hall; "Better Potato Dehydrating By Slow Freezing"; Food Engineering Mar. 1953, pp. 90, 91, 150, 152. 426-444

*Primary Examiner*—S. Leon Bashore
*Assistant Examiner*—Kenneth M. Schor
*Attorney, Agent, or Firm*—Cushman, Darby & Cushman

[57] ABSTRACT

Grits and like proteinaceous material in a form suitable for quick cooking and possessing a good texture and taste which is comparable to ordinary cooked grits and proteinaceous material is produced by fully gelatinizing the material with water and subsequently freezing the gelatinized material at a controlled rate. The gelatinized material is allowed to thaw and excess water is separated by a means for squeezing. The material is then dried to a final moisture content of less than 10% yielding a product which may be readily consumed without cooking in a minimum amount of time. The final product possesses good re-hydration qualities.

10 Claims, No Drawings

FREEZING PROCESS FOR PRODUCTION OF INSTANT GRITS

BACKGROUND OF THE INVENTION

A number of methods are known in the art to produce "instant" corn grits and other such proteinaceous vegetables. While these methods represent substantial progress in developing a truly instant product which can be prepared in the bowl without need of cooking by the consumer, such products suffer from a number of deficiencies such as poor qualities of rehydration, poor taste and palatability or mouth feel. Thus, while the prior art has been successful in reducing the cooking time of corn grit products, this generally has been done at the expense of the texture and flavor characteristics of the product when compared to conventionally cooked products.

Two prior art methods employed in the manufacture of instant grits are illustrated by U.S. Pat. No. 3,664,846 and 3,664,847 which involve the admixture of corn grits, water and polysaccharide gum to a two-stage heating treatment at critical temperatures with subsequent drying of the mixture for a critical period of time in a drum dryer. The resulting product collected from the dried sheet is comminuted to form an instant-type corn grits product. The products produced according to these methods do not require the addition of an emulsifier as employed in other prior art methods such as illustrated in U.S. Pat. No. 3,526,512 to Collins et al. A known process for producing quick cooking rice is illustrated in U.S. Pat. No. 2,813,796 whereby rice is steeped and cooked in water followed by a cooling, freezing and thawing treatment. The present invention provides a new process for producing instant corn grits having the advantage of shorter preparation times as well as the elimination of emulsifier ingredients. The process of our invention further provides a product possessing better rehydration characteristics and a texture and mouth feel comparable to conventionally cooked products.

Accordingly, it is the object of our invention to provide a corn grit product which may be readily prepared for consumption by simply adding warm water to the product in a serving bowl.

It is a further object of our invention to provide a corn grit product having good rehydration properties.

A still yet further object of our invention is to provide a corn grit product having a texture and mouth feel comparable with that of conventionally cooked corn grits.

Still yet, another object of our invention is to provide a method for providing an instant corn grit and like proteinaceous material product.

SUMMARY OF THE INVENTION

Our method for treating grits and similar proteinaceous material is basically a five-step process which first involves:

a. Fully gelatinizing a selected initial product material preferably without any dextrinization;

b. Freezing the gelatinized material at a controlled rate;

c. Thawing the frozen material;

d. Removing and separating excess water from the thawed material by mechanical means of pressing and/or squeezing; and finally e. Drying the material to produce a product having a moisture content of less than 10% by weight. This results in a product having a texture and taste comparable to conventional cooked grits and like proteinaceous material, as well as having good rehydration qualities.

The initial product employed in the process of our invention is a blend of various size fine grits or other proteinaceous material. The initial product is a blend of various sizes in certain proportions of the material. The preferred blend includes medium and fine screenings having a seive size greater than 20 mesh and passing through 12 mesh (all mesh sizes herein being U.S. Standard screen sizes).

Aside from grits, any additional proteinaceous material may be included within the scope of our invention - for example, wheat, barley, oats and the like are within the generic group of materials suitable for an initial product. The preferred initial product is fine corn grits preferably from white corn, although yellow corn is also well suited for our process. The grit comprises the flinty endosperm of the corn kernel iteself. In order to provide the initial product employed in the present invention, it is preferred that the husk and germ be removed from the whole corn kernel. This may be accomplished by roll milling, screening and air sifting according to such conventional methods as illustrated by U.S. Pat. No. 3,399,839 to Anderson et al which is incorporated herein be reference. Generally, such milling processes will produce several grades of grits such as fine, medium and coarse. The difference in these three grades is the screen sizing used to define each. As noted above, the initial product is a blend preferably medium and fine of these grades.

For the present disclosure, these grades are defined as follows:

fine screenings — 100% passing 16 mesh and retained on 20 mesh screen.

medium screenings — 100% passing 12 mesh and retained on 16 mesh screen.

coarse screenings 13 passing 8 mesh and retained on 12 mesh screen.

While it is preferred to employ a blend variable size of grits as the initial product in this invention, it has also been found that degerminated ground corn kernels as well as whole ground corn with germ may be useful in the present process to produce an instant "grit tasting" corn product. The use of degerminated ground corn kernels and the like yields an instant cornmeal grit tasting product having a taste and texture very similar to conventionally cooked grits. A preferred initial product is freshly prepared corn grits readily available from a number of commercial mixes, e.g. Jim Dandy Grits (fine, medium or coarse), produced by The Jim Dandy Company.

The first step of our process, after selecting and/or preparing a suitable initial product, is to gelatinize fully the initial product in water without allowing any significant dextrinization of the material to occur. The term "gelatinization" is defined herein as the complete rupture of the starch granule (grit of whole kernel), brought about by the combination of moisture, heat, pressure and in some instances mechanical shear. The structure of the gelatinized and fully expanded product can having a large cell size or a small size depending upon the initial product processed. Gelatinization is accomplished by cooking the initial product with water at atmospheric pressure, or alternatively in either a pressure cooker or autoclave for a period of time sufficient to completely rupture the starch granule. It is preferred to use a pressure cooker in order to reduce the amount of time and energy needed to achieve full gelatinization of the product. The initial product may be cooked in an open air kettle at 212° F or boiling temperature. Generally, the cooking time will be a minimum of about 15 minutes at 212° F using a water/grits ratio of approximately 8 to 1. It is essential that the grits be thoroughly gelatinized while avoiding dextrinization, i.e. further breakdown of the starch into sugar components. Cooking times at lower ratios will be reduced proportionately. A cooking temperature of 220° F can be accomplished using saturated steam at a pressure of 5 to 10 psig. It is critical that the ratio of water to grits during the gelatinization be not less than 3 to 1 by weight. An optimum ratio has been found to be 8 parts water to 1 part grits, but ranges up to as high as 10 to 12 parts of water per part of grits may be employed. However, at such higher ratios the process becomes uneconomical due to excess heat required etc. The conventional steeping processes employed by the prior art have been found unnecessary in the present invention and thus our process of fully gelatinizing the material without any dextrinization eliminates some of the cost and time employed in prior art processes.

The minimum ratio of water being 3 to 1 is considered critical from the standpoint of avoiding agglomeration in the vat and subsequent conveying steps. During gelatinization, the product will absorb water, and therefore water present must be sufficient to avoid drying and agglomerating at this stage of the process.

After the product has been thoroughly gelatinized, it is then frozen at a controlled rate. The term "controlled rate" is defined as the rate at which the latent heat of ice (or crystallization) is absorbed or removed from the product to maximize the size of resulting ice lattice crystals.

The drop in temperature from the cooking level of approximately 212° F to the threshold of freezing, that is about 33° F, may be accomplished in as rapid a manner as desirable, for example, in the presence of liquid Freon. Rapid freezing is preferably to be avoided while the time for cooling the material to the freezing zone is not considered as important. It is preferred that the withdrawal of the heat of crystallization be carried out over a prolonged period of time (i.e. the drop in temperature from about 33° F to 31.5° F be done slowly) to allow the largest possible ice crystals to form. The latent heat of ice must be accounted for and while not wishing to be limited to or bound thereby, it is theorized that this withdrawal must occur at a controlled rate in order to avoid entrapping the liquid water within the starch matrix. It is believed that withdrawal under prolonged controlled conditions allows the water to seep from the starch matrix and upon crystallization form a lattice structure to the exterior of the starch molecules. The water seems to crystallize out of the starch molecule and becomes almost an exudate. It is thought that the expansion phenomenon of water at freezing may also play a part in aiding in the rupture of the starch molecule matrix to reduce its ability to reabsorb the water when thawed. Upon subsequent thawing, the starch does not reabsorb this water. Too rapid a withdrawal of heat would appear to entrap the liquid water within the starch matrix. Thus, the freezing which occurs during the present process is similar to a purification process wherein the phenomenon of purification by crystallization is maximized by extending the time for withdrawal of the heat of crystallization to a prolonged period, sufficient to allow the water to form large crystals of ice having a certain degree of freedom outside of the starch matrix. The time through the freezing temperature may be as low as about 2 to 3 minutes.

During the freezing stage, the product need not be in a sealed container. Furthermore, the period of time which the gelatinized mass is in the frozen state is not critical and indeed should be at a minimum. However, the freezing step must be prolonged for a period of time to insure complete crystallization of the entire gelatinized mass. As an example, a batch of fully gelatinized grits and water was transferred to a flat aluminum pan at a depth of approximately 1 inch from the bottom of the pan, with a thermal couple inserted approximately ½ inch into the cooked layer. The mass was subsequently placed in a refrigerator and allowed to cool for a time sufficient to bring the mass to 40° F. The mass was then placed in a freezer and left there for a period of time sufficient that the entire cooked mass was at a temperature of 31° F.

The third step of the present invention involves thawing the frozen mass to change the physical state of the water from ice to liquid in order that the water may be removed. Generally, it has been found that the frozen product comprises approximately 95% water by weight. The conditions under which thawing occurs are not critical and it is only necessary that the temperature be sufficient to liquify the crystallized water, for example raise the temperature to about 5°–10° F above freezing for a period of about thirty minutes. Tap water may be directly poured onto the product, or alternatively warm water may be employed to speed thawing. However, it is most economical to allow the product to thaw by standing at room temperature. The product upon thawing generally has a moisture content of about 95% by weight.

Melted ice comes free of the product and can be easily squeezed out by any of a number of means such as cheese cloth, air press, or centrifuging. For example, the thawed mass may be subjected to a Williams Air Press at an air pressure of 4.5 kilos/cm² or alternatively to a centrifugal force of about 190 g's to remove excess water. Thus, after thawing the frozen mass the product is physically squeezed to remove excess water. Generally, the product, after squeezing, has a moisture content of approximately 60 to 65%. This is the maximum water content that can be removed generally by physical processes. Generally, the starch particles of the product appear rather hardy after freezing and may be mashed without becoming mushy. The product may need screening after squeezing or centrifuging in order to break up lumps. A No. 5 U.S. screen may be used.

It should be noted that in the practice of the present invention it may be found desirable to recycle the water resulting from the thawing and squeezing steps indicated above. The water may be recycled directly to the cooked grits prior to undergoing cooling and freezing or indirectly to a jacketed vessel surrounding the cooked grits in an effort to assist in further cooling. Another portion of the recycled water may be recycled to the initial product for entry into the gelatinization cycle. One should bear in mind when recycling water that problems may arise from the presence of bacteria which must be eliminated in any recycle material to the cooked product.

As noted, the thawing stage generally takes place at ambient temperatures to bring the crystallized water into liquid form and is thereafter followed by a squeezing stage of the sponge-like material to remove additional water. Upon thawing and subsequent squeezing the product has been found to contain from between about 60 and 65% by weight of water. The desirability of recycling and maintaining the thawed water in the product, stems from the theory that such cooking water contains many of the flavoring constituents and vitamins which are so advantageous to the final product which may be lost upon discarding at this stage of the process.

The next step of the process requires drying of the mass after squeezing excess water in order to remove additional remaining water and form a product having a moisture content of less than 10%, preferably a moisture content of less than approximately 3 to 5% on a weight basis. It has been found that drying may be accomplished in air at a temperature of 160° to 180° F. This temperature range has been found to be optimum in order to preserve the integrity of the products both with regard to texture and rehydration qualities. However, higher temperatures may be employed, but the product suffers from poor rehydration characteristics. Certainly, lower temperatures may also be employed, but due to the excess cost and increased time consumption such are not feasible as they take a longer period of time to accomplish the required drying. It is therefore necessary that the drying be accomplished in such a manner as to preserve the integrity of the particle, physical shape and texture. Other types of drying may be employed such as microwave, radiant heat, dielectric mechanisms, rotary tumbling dryer, etc. but drying by air has been found to be the most economical. Tests have shown that the time required for drying the product at temperatures between 170° and 180° F to a final moisture content of about 3–4% is generally about 50 minutes.

Upon drying, the product mass is found to contain a moisture content of generally between 3 and 5% and consists of a product which possesses upon the addition of water, a texture and taste comparable to ordinary cooked grits. The density of the instant grits manufactured according to the process of the present invention is generally about 15 pounds per cubic foot or 246 milligrams per cc.

An optional step, subsequent to drying of the mass, for improved flavor, involves toasting a portion of the dried product for example under the radiant heat of a Chromalox two-element heater. Generally, only about 25% of the mass is toasted. The toasted batch is then mixed back with the remaining 75% of the dried mass to yield a finished product. During toasting, any high heat source to burn or toast the product is employed, such as the Chromalox heater noted. Toasting may be accomplished, for example, by holding such a source approximately 2 inches above the product and sliding a tray containing the product under the heater while shaking the tray until the desired degree of toasting is visibly obtained.

Should one desire uniformity in size of the product, a grinding and screening step may be employed either subsequent to toasting and mixing, or subsequent to drying of the product. Such a grinding and screening step may be particularly advantageous when initial products other than cracked grits are employed, for example coarse grain or whole grain cornmeal and may be accomplished using such conventional means as a Fitz mill to yield a product having a particle suitable for re-hydration. It is desirable to add salt to the product. Generally, about 3% salt by weight of the initial product is added, preferably after the squeezing of the thawed mass and prior to drying. Other additives and conventional preservatives may be added at the same time as the salt to prevent bacteria attack and degradation of the cooked material. Such preservatives are well known in the art and are of an antioxidant nature to prevent degradation via air and bacteria. Examples of such additives and preservatives include flavors, cellulose gum, BHA (a preservative), thiamine, riboflavin, niacin and iron.

The following examples are provided to more fully illustrate the invention but are not to be construed as limiting the scope thereof.

EXAMPLE 1

A blend of freshly prepared corn grits (fine and medium grade commercially available from The Jim Dandy Company) is mixed with water in a ratio of 8:1 (water/grits) by weight. The mixture is placed in a 6 in. diameter jacketed screw conveyor cooker having a length of eight feet. The jacket is saturated with 5 psig steam at a temperature of 220° F and conveyor operated at about ½ rpm. Retention time in the conveyor is about 20 to 30 minutes for full gelatinization without dextrinization.

The fully gelatinized product is then placed in an aluminum pan and with about a 1-inch depth of product, the pan is lowered into a bath of ice water. The product is agitated and stirred until product temperature in center is 40° F (measured by thermometer). The pan and product is then placed in a refrigerator at 3.5° F until the entire mass is frozen solid. The pan and frozen product is then allowed to stand at ambient room temperature until completely thawed whereupon water is removed from the product by squeezing out using a Williams Air Press at an air pressure of 4–5 kilos/cm$^2$. The product being somewhat lumpy is screened through a No. 5 screen (U.S.). The product is then dried at a temperature of 170° F for about 50 minutes in a simple convection drying over. The resulting product has a moisture content of about 3 to 5%, and upon addition of warm water readily rehydrates having a taste and texture comparable to ordinary cooked grits.

EXAMPLE 2

Twenty-five percent of the final product of Example 1 is toasted for flavor under a 1100 watt, two-element Chromalox radiant heater. This is done by sliding a tray of product under the heater and shaking until desired degree of toasting is visible. The toasted product may be remixed with the remaining final product from Example 1 to give a mixed product of enhanced flavor.

The products of Examples 1 and 2 may, if needed, be ground and screened to give a uniform product. However, this is not necessary to produce a final "instant grit" product according to our process.

The instant grits prepared according to our process have been both analyzed by gas chromatography and tasted by definitive taste testing and have been found comparable to ordinary cooked grits.

The invention in its broader aspects is not limited to the specific details shown and described, but departures may be made from such details within the scope of the accompanying claims without departing from the principles of the invention. Furthermore, this invention may comprise, consist essentially of or consist of the recited steps.

What is claimed is:

1. A process of treating grits material to produce a quick-cooking product, which possesses a texture and taste comparable to ordinary cooked grits material as well as good rehydration qualities, comprising:
   a. fully gelatinizing the material in water wherein the ratio of water to grits during gelatinization is at least 3:1 by weight;
   b. freezing the gelatinized material and water at a controlled rate until complete crystallization of the gelatinized material;
   c. thawing the frozen gelatinized material;
   d. squeezing the thawed material to separate excess water from the gelatinized material;
   e. drying the material to a final moisture content of less than 10%, whereby a quick-cooking product is obtained.

2. Process of claim 1 wherein the ratio is about 8:1.

3. Process of claim 1 wherein gelatinizing is done under pressure.

4. Process of claim 1 wherein the squeezed material has a remaining moisture content of from about 60 to about 65 percent.

5. Process of claim 1 wherein drying takes place at a temperature from about 160° to about 180° F.

6. Process of claim 1 further comprising the step of toasting the dried material.

7. Process of claim 1 further comprising the steps of grinding and screening the dried material to produce a uniform product.

8. Process of claim 6 further comprising grinding and screening the toasted material to produce a uniform product.

9. Process of claim 1 wherein water from said thawing and squeezing is recycled to a subsequently gelatinized material prior to freezing.

10. Process of claim 1 wherein water from said thawing and squeezing is recycled to a subsequently gelatinized material prior to gelatinizing.

* * * * *

UNITED STATES PATENT OFFICE
CERTIFICATE OF CORRECTION

Patent No. 3,989,855  Dated Nov. 2, 1976

Inventor(s) Benjamin Bostick Jones et al

It is certified that error appears in the above-identified patent and that said Letters Patent are hereby corrected as shown below:

IN THE SPECIFICATION:

Column 2, line 40, delete "13", and insert therefore -- —100% --.

*Signed and Sealed this*

Fifth *Day of* April 1977

[SEAL]

*Attest:*

RUTH C. MASON
*Attesting Officer*

C. MARSHALL DANN
*Commissioner of Patents and Trademarks*